Patented Nov. 10, 1953

2,658,903

UNITED STATES PATENT OFFICE 2,658,903

PREPARATION OF THIOPHENE AND ALKYLATED THIOPHENES

Benjamin F. Tullar, East Greenbush, and Rolland F. Feldkamp, Troy, N. Y., assignors to Sterling Drug Inc., New York, N. Y., a corporation of Delaware No Drawing. Application March 9, 1951,
Serial No. 214,846

5 Claims. (Cl. 260—329)

This invention relates to an improvement in the process for preparing a thiophene by reaction of a salt of a succinic acid and a sulfide of phosphorus, and comprises heating the reactants dispersed in a high boiling, inert organic liquid.

The process is adapted to the preparation of thiophene, 3-substituted thiophenes and 3,4-disubstituted thiophenes from succinic acid, alpha-substituted succinic acids and alpha,alpha'-disubstituted succinic acids respectively. In other words, succinic acids having the formula

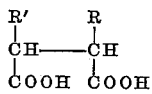

can be converted by the new process into thiophenes having the formula

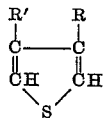

wherein R and R' are hydrogen or inert organic radicals, preferably lower-alkyl groups.

The reaction of a salt of a succinic acid and a sulfide of phosphorus to give a thiophene compound has been known for over sixty years, but the method used has invariably involved a dry fusion of the reactants in which the reaction rate cannot be readily controlled, thus entailing hazards of violent reaction. The residue remaining after the dry fusion has long been known to be pyrophoric and difficult to dispose of.

We have found that these difficulties can be obviated by dispersing the reactants in a high boiling, inert organic liquid. To our surprise we found that this expedient also produced a marked improvement in yield. The yield of 3-methylthiophene from a salt of methylsuccinic acid and phosphorus sulfide heated in a dispersing medium was at least double that which had been obtained by the dry fusion process. The dispersing liquid acts as a heat transfer medium and thus holds the reaction temperature constant throughout the mixture and prevents the local overheating and resulting violent reaction which is so likely in the dry fusion process. The rate of the reaction can be readily controlled by gradual addition of one of the reactants to the heated dispersion of the other reactant, or by gradual addition of a mixture of both reactants to the heated dispersing medium. When a dispersing medium is used the reaction occurs readily at a constant temperature of 250° C., whereas in the dry fusion process the reaction does not start until the mixture is heated to about 280° C. and the resulting exothermic reaction carries the temperature up to about 380° C. with consequential hazards of decomposition and combustion. In the new method the residue remaining after the reaction and after removal of the dispersing liquid is not pyrophoric as in the dry fusion method, and is readily removed from the reaction vessel and disposed of.

The new process is especially valuable for the preparation of alkylated thiophenes since there have been no readily available satisfactory methods for preparing them. The process is particularly adapted to the synthesis of 3-methylthiophene from a salt of methylsuccinic acid and a sulfide of phosphorus, using a high boiling, inert organic liquid as a dispersing medium. In this way we have obtained yields of 60–64% of 3-methylthiophene, whereas 30% is the best yield obtained by any of the prior art procedures using the same reactants.

The inert organic liquid used as a dispersing medium must have a boiling point at least above about 225° C. which is the minimum temperature at which the reaction between the salt of a succinic acid and the sulfide of phosphorus takes place at a reasonable rate. The reaction occurs most readily and satisfactorily at about 250° C. and the dispersing medium should therefore preferably boil at a higher temperature in order that it will not vaporize to a very great extent together with the thiophene compound. The dispersing medium must also be one which does not react appreciably with either of the reactants or undergo polymerization or other alteration at temperatures below about 300° C. Liquids which meet these requirements include hydrocarbons and oxygenated organic liquids of an unreactive nature, such as ethers. Mineral oil and Dowtherm A (a eutectic mixture containing 73.5% diphenyl ether and 26.5% diphenyl) have been found to be particularly suitable media.

Any salt of the succinic acid can be used in the reaction. For convenience it is preferred to use an alkali or alkaline earth metal salt such as the sodium, potassium, calcium or magnesium salts. The ammonium salt can also be employed.

The sulfide of phosphorus used is preferably the readily available tetraphosphorus heptasulfide, $P_4S_7$. There is considerable confusion in the literature concerning the constitution of the phosphorus sulfides used in organic reactions (see Pernert and Brown, Chem. and Eng. News, 27, 2143 (1949)). It has been established that the "phosphorus trisulfide" designated by previous investigations is actually tetraphosphorus heptasulfide ($P_4S_7$) of a varying degree of purity.

The reaction is conveniently carried out by gradual addition of an intimate mixture of the salt of a succinic acid and an excess of tetraphosphorus heptasulfide suspended in the inert organic liquid to more of the inert organic liquid heated to about 250° C. and with stirring. Maintenance of an inert atmosphere, conveniently by passing in nitrogen or carbon dioxide, is desirable. The apparatus is preferably set up for downward distillation whereby the thiophene compound distils out and is collected as soon as it is formed. If the inert organic liquid is relatively volatile, i. e. boils only slightly above 250° C., some may distil along with the thiophene compound, but the latter is readily purified by redistillation. After the reaction is complete, the dispersing medium can be readily recovered by filtration after cooling and can be reused a number of times.

Example 1

Mineral oil (300 cc.) was placed in a two liter, three-necked round-bottomed flask equipped with a sealed stirrer, thermometer, condenser set for downward distillation, gas inlet tube and a funnel for introducing the mixture of reactants, set up under an efficient hood. The flask was provided with an electrically heated spherical mantle suitable for heating the reaction mixture to 240–250° C. Under a slow continuous passage of carbon dioxide and with good mechanical stirring at 240–250° C., a slurry of 180 g. of disodium methylsuccinate (prepared by hydrogenation of a concentrated aqueous solution of the disodium salt of itaconic acid at 50 lbs. hydrogen pressure and 80–100° C. using Raney nickel catalyst) and 200 g. of tetraphosphorus heptasulfide in 500 cc. of mineral oil was added through the funnel, using a stirring rod of suitable diameter for stopping the flow of the slurry, at such a rate as to produce a fairly rapid distillation of 3-methylthiophene. The reaction was accompanied by rather vigorous gas evolution (mostly hydrogen sulfide). After the completion of the addition of the slurry, requiring about one hour, the heating and stirring were continued in the carbon dioxide atmosphere for an additional hour until distillation of the 3-methylthiophene ceased. The total distillate (82 cc.) was washed twice with 100 cc. of 5% sodium hydroxide solution and with 100 cc. of water, and then redistilled giving 64 g. of 3-methylthiophene, B. P. 114–115° C. (760 mm.); $n_D^{25}=1.5170$.

The reaction residue was allowed to cool to 25° C. and filtered using suction to recover a dark mineral oil solution suitable for reuse in this process. The filter-cake containing excess tetraphosphorus heptasulfide and other byproducts was malodorous but not pyrophoric, and was almost completely soluble in water (with evolution of hydrogen sulfide) or in dilute alkali and thus could readily be disposed of.

Example 2

The same procedure as that described in Example 1 was carried out, but using Dowtherm A (B. P. 260° C.) instead of mineral oil. Since the reaction temperature was close to the boiling point of the Dowtherm A, considerable quantities thereof distilled along with the 3-methylthiophene. The distillate (120–150 cc.), after washing and redistillation, gave the same yield of pure 3-methylthiophene as was obtained in Example 1. Dowtherm provided a more fluid reaction mixture and was more easily purified by vacuum distillation than the mineral oil.

Example 3

Following the general procedure described in Example 1, a slurry of 170 g. of calcium methylsuccinate and 180 g. of tetraphosphorus heptasulfide in 450 cc. of Dowtherm A was added to 400 cc. of Dowtherm A at 250–60° C., while nitrogen was passed through the system. The distillate, after washing with aqueous potassium hydroxide, was fractionated to give 23 g. of 3-methylthiophene, B. P. 114–115° C.

Example 4

A suspension of 162 g. of disodium succinate and 180 g. of tetraphosphorus heptasulfide in 700 cc. of mineral oil was heated slowly in an apparatus set up as described in Example 1. A nitrogen atmosphere was maintained above the reaction mixture. The first drops of distillate were observed when the temperature of the mixture reached 195° C. The mixture was gradually heated to 300° C. at which point no further distillate was being formed. The resulting 55 g. of distillate was washed with potassium hydroxide solution, the alkaline layer was extracted with ether and the ether layer combined with the distillate. The product was fractionated giving 27 g. of thiophene, B. P. 84° C.

By the method described in the above examples, 3-ethylthiophene can be prepared by heating a salt of ethylsuccinic acid and tetraphosphorus heptasulfide dispersed in mineral oil or Dowtherm A, and 3,4-dimethylthiophene can be prepared by heating a salt of alpha-alpha'-dimethylsuccinic acid and tetraphosphorus heptasulfide dispersed in mineral oil or Dowtherm A.

We claim:

1. In the process for preparing a thiophene compound selected from the class consisting of thiophene, 3-lower-alkylated thiophenes and 3,4-di-lower-alkylated thiophenes by heating a salt of a succinic acid compound selected from the class consisting of succinic acid, alpha-lower-alkylated succinic acids and alpha,alpha'-di-lower-alkylated succinic acids with a sulfide of phosphorus and recovering the vaporized thiophene compound, the improvement which comprises conducting said heating step while said salt and said sulfide are dispersed in an organic liquid inert to the reaction conditions and boiling above about 225° C.

2. The process for preparing 3-methylthiophene which comprises heating at a temperature between about 225° C. and 300° C. a salt of methylsuccinic acid and an excess of a sulfide of phosphorus dispersed in an organic liquid inert to the reaction conditions and boiling above about 225° C., and recovering the vaporized 3-methylthiophene thus formed.

3. The process for preparing 3-methylthiophene which comprises heating at a temperature between about 225° C. and 300° C. disodium methylsuccinate and an excess of tetraphosphorus heptasulfide dispersed in an organic liquid inert to the reaction conditions and boiling above about 225° C., and recovering the vaporized 3-methylthiophene thus formed.

4. The process for preparing 3-methylthiophene which comprises heating at a temperature between about 225° C. and 300° C. disodium methylsuccinate and an excess of tetraphosphorus heptasulfide dispersed in mineral oil, and recovering the vaporized 3-methylthiophene thus formed.

5. The process for preparing 3-methylthiophene which comprises heating at a temperature between about 225° C. and 300° C. disodium methylsuccinate and an excess of tetraphosphorus heptasulfide dispersed in a eutectic mixture of diphenyl ether and diphenyl, and recovering the vaporized 3-methylthiophene thus formed.

BENJAMIN F. TULLAR.
ROLLAND F. FELDKAMP.

References Cited in the file of this patent
Meyer et al.: Berichte 18, 3010.